(12) United States Patent
Lim

(10) Patent No.: US 12,361,248 B2
(45) Date of Patent: Jul. 15, 2025

(54) TWO-DIMENSIONAL CODE AND METHOD AND SYSTEM FOR GENERATING AND READING THEREOF

(71) Applicant: Aires Investment Holdings Private Limited, Singapore (SG)

(72) Inventor: Meng Liang Lim, Singapore (SG)

(73) Assignee: Aires Investment Holdings Private Limited, Singapore (SG)

( * ) Notice: Subject to any disclaimer, the term of this patent is extended or adjusted under 35 U.S.C. 154(b) by 0 days.

(21) Appl. No.: 18/726,408

(22) PCT Filed: May 19, 2023

(86) PCT No.: PCT/SG2023/050345
§ 371 (c)(1),
(2) Date: Nov. 28, 2024

(87) PCT Pub. No.: WO2024/242620
PCT Pub. Date: Nov. 28, 2024

(65) Prior Publication Data
US 2025/0117615 A1     Apr. 10, 2025

(51) Int. Cl.
*G06K 19/06* (2006.01)
*G06K 7/14* (2006.01)

(52) U.S. Cl.
CPC ..... *G06K 19/06037* (2013.01); *G06K 7/1408* (2013.01); *G06K 19/0614* (2013.01)

(58) Field of Classification Search
CPC .................. G06K 19/06; G06K 7/14
See application file for complete search history.

(56) References Cited

U.S. PATENT DOCUMENTS

| | | | |
|---|---|---|---|
| 5,128,528 A | 7/1992 | Heninger | |
| 5,583,331 A * | 12/1996 | Dvorkis | G06K 7/10871 235/462.43 |
| 6,577,249 B1 * | 6/2003 | Akatsuka | G06T 7/73 340/988 |

(Continued)

FOREIGN PATENT DOCUMENTS

CN    115293186 A    11/2022

OTHER PUBLICATIONS

International Search Report of International Application No. PCT/SG2023/050345, Oct. 12, 2023, pp. 1-3, Intellectual Property Office of Singapore.

(Continued)

*Primary Examiner* — Thien M Le
(74) *Attorney, Agent, or Firm* — Bochner PLLC; Serge Krimnus

(57) ABSTRACT

Embodiments of the invention provide a two-dimensional code which comprises a plurality of optically readable and distinct indicia which are arranged on a two-dimensional area, wherein the indicia include a reference indicium and further includes at least one data indicium which represents at least one data value respectively, wherein the at least one data value is represented by at least one distance between the reference indicium and the at least one data indicium, and at least one angular displacement of the at least one data indicium which is relative to a reference direction, and wherein the reference direction is based on at least one of the indicia which is asymmetric or includes at most one line of symmetry.

25 Claims, 5 Drawing Sheets

(56) References Cited

U.S. PATENT DOCUMENTS

| | | | |
|---|---|---|---|
| 2003/0047538 A1* | 3/2003 | Trpkovski | B23K 26/10 |
| | | | 216/84 |
| 2005/0036672 A1* | 2/2005 | Chen | G01B 11/2513 |
| | | | 382/154 |
| 2008/0240614 A1 | 10/2008 | Garcia | |
| 2013/0093733 A1* | 4/2013 | Yoshida | G09G 3/30 |
| | | | 345/76 |
| 2016/0335528 A1 | 11/2016 | Yoshida | |
| 2017/0168160 A1* | 6/2017 | Metzler | G01S 17/86 |
| 2019/0332840 A1* | 10/2019 | Sharma | G06K 7/1443 |
| 2019/0333230 A1* | 10/2019 | Rode | G06T 7/80 |
| 2020/0225673 A1* | 7/2020 | Ebrahimi Afrouzi | |
| | | | A47L 11/4011 |
| 2021/0103786 A1* | 4/2021 | Yoshida | H04L 9/0861 |
| 2022/0036024 A1* | 2/2022 | Liu | G06K 7/1417 |

OTHER PUBLICATIONS

Russakovsky, O., Deng, J., Su, H., et al., "ImageNet Large Scale Visual Recognition Challenge," Int J Comput Vis 115, 211-252 (2015).
Zou, Z, Chen, K. Shi, Z, Guo, Y and Ye, J, "Object Detection in 20 Years: A Survey," in Proceedings of the IEEE, vol. 111, No. 3, pp. 257-276, Mar. 2023.
Written Opinion of The International Preliminary Examining Authority for International Application No. PCT/SG2023/050345, pp. 1-4, Intellectual Property Office of Singapore, Dec. 27, 2023.
International Preliminary Report on Patentability for International Application No. PCT/SG2023/050345, pp. 1-4, Feb. 26, 2024.

\* cited by examiner

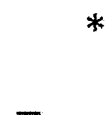
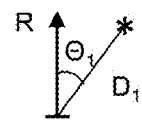
Figure 1A                    Figure 1B
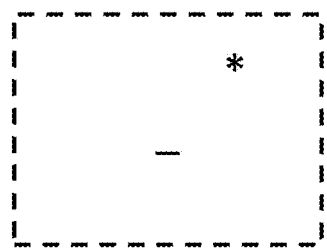
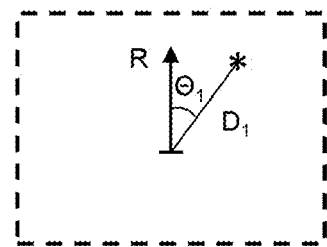
Figure 2A                    Figure 2B
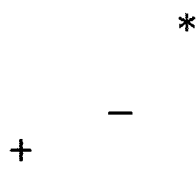
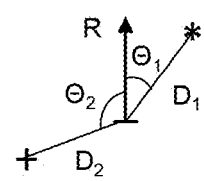
Figure 3A                    Figure 3B
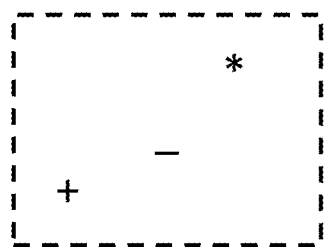
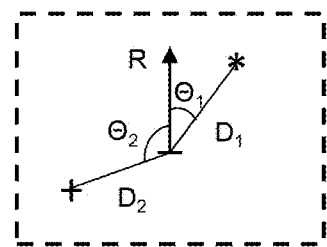
Figure 4A                    Figure 4B

Figure 5A                               Figure 5B
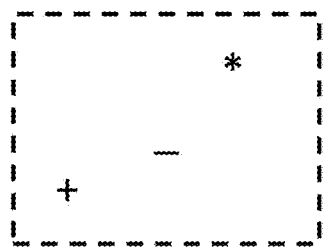      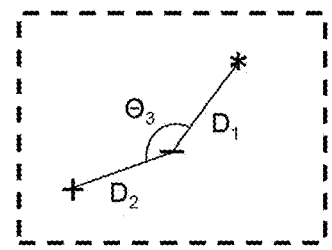
Figure 6A                               Figure 6B
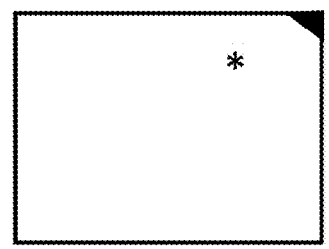      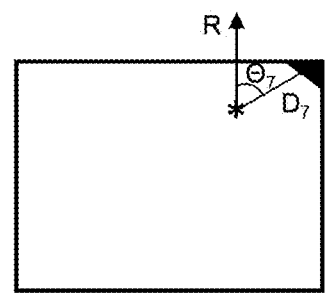
Figure 7A                               Figure 7B
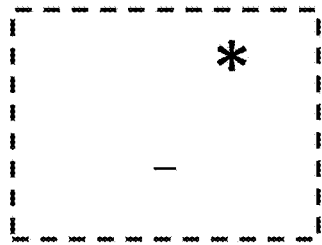      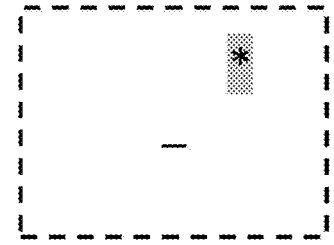
Figure 8                                Figure 9

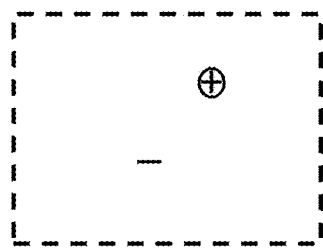
Figure 10
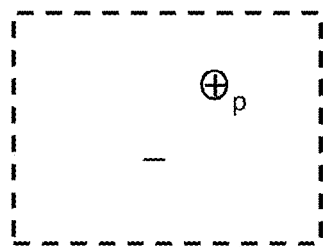 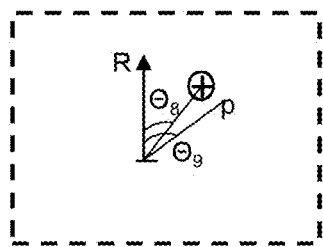
Figure 11A                    Figure 11B
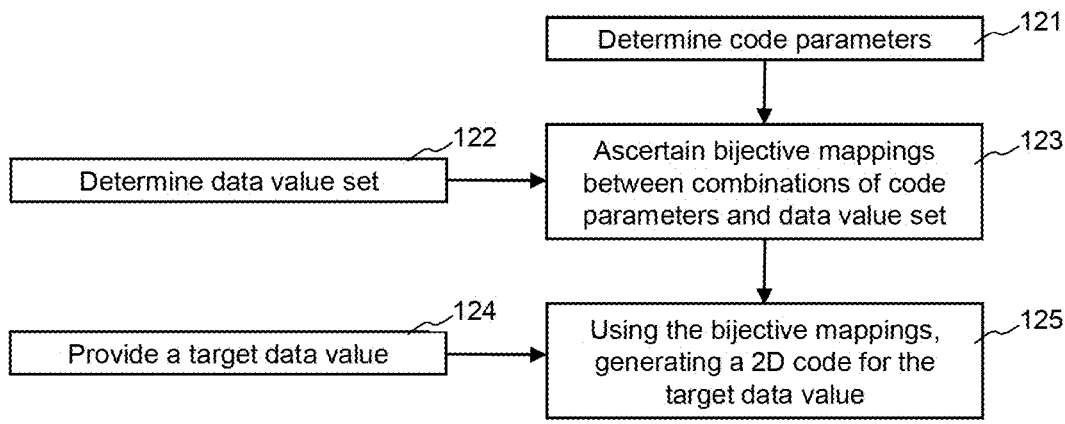
Figure 12A

| Distance between reference indicium '-' and data indicium '*' | Angular displacement between reference indicium '-' and data indicium '*' | Size of data indicium '*' | Data value set |
|---|---|---|---|
| 1 mm | 5° | 100% | 1 |
| 5 mm | 5° | 100% | 2 |
| 10 mm | 5° | 100% | 3 |
| 15 mm | 5° | 100% | 4 |
| 20 mm | 5° | 100% | 5 |
| 1 mm | 10° | 100% | 6 |
| 5 mm | 10° | 100% | 7 |
| 10 mm | 10° | 100% | 8 |
| 15 mm | 10° | 100% | 9 |
| 20 mm | 10° | 100% | 10 |
| 1 mm | 5° | 110% | 11 |
| 5 mm | 5° | 110% | 12 |
| 10 mm | 5° | 110% | 13 |
| 15 mm | 5° | 110% | 14 |
| 20 mm | 5° | 110% | 15 |
| 1 mm | 10° | 110% | 16 |
| 5 mm | 10° | 110% | 17 |
| 10 mm | 10° | 110% | 18 |
| 15 mm | 10° | 110% | 19 |
| 20 mm | 10° | 110% | 20 | ively adopting machine-readable codes as optical

TWO-DIMENSIONAL CODE AND METHOD AND SYSTEM FOR GENERATING AND READING THEREOF

FIELD OF THE INVENTION

Embodiments of the invention relate to two-dimensional (2D) machine-readable code, including two-dimensional images containing machine-readable data, and particularly to its representation, and method and system for generating and reading two-dimensional codes.

BACKGROUND

Since the introduction of barcodes in the 20th century, two-dimensional codes have been utilized to facilitate commerce from manufacturing to retail. The development and progress of two-dimensional codes is inevitably intertwined with the prevailing optical technology available. For the case of barcodes, developments of scanners enabled its widespread usage. There have been vast improvements in two-dimensional codes since the introduction of barcodes. Such improvements include the QR code developed by Denso Wave that can store significantly larger amounts of data than a regular barcode. Today, there are a wide variety of two-dimensional codes that are designed for various purposes and utilize a wide range of characteristics including colour and many more.

Notwithstanding the prevalent adoption of barcodes, QR codes and other two-dimensional codes, there is a need for alternative and useful machine-readable codes as optical technology advances and improves over time.

SUMMARY

According to a first aspect of the invention, a two-dimensional code is provided which comprises:
  a plurality of optically readable and distinct indicia which are arranged on a two-dimensional area, wherein the indicia include a reference indicium and further include at least one data indicium which represents at least one data value respectively,
  wherein the at least one data value is represented by at least one distance between the reference indicium and the at least one data indicium, and at least one angular displacement of the at least one data indicium which is relative to a reference direction, and
  wherein the reference direction is based on a first one of the indicia which is asymmetric or includes at most one line of symmetry, and
  wherein the at least one data indicium includes a first data indicium and a second data indicium which are arranged at non-overlap positions and respectively represent a first data value and a second data value, wherein the second data value is adjustable by a predetermined positional adjustment, which is based on a difference between the non-overlap positions, to represent the first data value.

Embodiments of the first aspect are provided as recited in claim 2 to claim 9.

According to a second aspect of the invention, a method for two-dimensional code generation is provided which comprises:
  ascertaining a plurality of bijective mappings between a plurality of combinations of code parameters and a plurality of data values; and for a target data value, generating the two-dimensional code according to any one of the embodiments described herein, by using the bijective mappings, wherein the at least one data value includes the target data value, wherein the code parameters include the distance and the angular displacement.

According to a third aspect of the invention, an apparatus for two-dimensional code generation is provided which comprises:
  at least one memory for storing computer-executable instructions; and
  at least one processor communicably coupled to the at least memory unit and configured to: execute the computer-executable instructions to perform the method according to any one of the embodiments described herein.

According to a fourth aspect of the invention, a non-transitory, computer readable medium comprises computer-executable instructions configured to direct at least one computer processor to perform the method according to any one of the embodiments described herein.

According to a fifth aspect of the invention, an apparatus for generating two-dimensional code is provided which comprises:
  at least one processor;
  at least one memory;
  a data value set module stored in the at least one memory and executable by the at least one processor to determine a plurality of data values including a target data value;
  a code parameter module stored in the at least one memory and executable by the at least one processor to determine a plurality of combinations of code parameters;
  a mapping module stored in the at least one memory and executable by the at least one processor to ascertain a plurality of bijective mappings between a plurality of combinations of code parameters and a plurality of data values; and
  a code generation module stored in the at least one memory and executable by the at least one processor to generate, using the bijective mappings, the two-dimensional code according to any one of the embodiments described herein for the target data value, wherein the target data value is the at least one data value, wherein the code parameters include the distance and the angular displacement.

According to a sixth aspect of the invention, a method for reading two-dimensional code is provided which comprises:
  obtaining an image of the two-dimensional code;
  performing image processing on the image, including:
    based on the image, detecting a plurality of distinct indicia;
    based on the detected indicia, ascertaining a reference indicium and at least one data indicium;
    ascertaining a distance between the reference indicium and the at least one data indicium;
    ascertaining an angular displacement of the at least one data indicium relative to a reference direction, wherein the reference direction is based on a first one of the indicia which is asymmetric or includes at most one line of symmetry; and
    based on the ascertained distance, the ascertained angular displacement, and a plurality of bijective mappings between a plurality of combinations of code parameters and a plurality of data values, ascertaining at least one data value of the plurality of data values which corresponds to the at least one data indicium, wherein the code parameters include the distance and the angular displacement,
wherein the at least one data indicium includes a first data indicium and a second data indicium which are arranged at non-overlap positions, and
wherein ascertaining the at least one data value of the plurality of data values which corresponds to the at least one data indicium includes:
ascertaining either the first data indicium or the second data indicium as having a predetermined positional adjustment; and
ascertaining a first data value and a second data value, respectively for the first data indicium or the second data indicium, as same data values.

Embodiments of the sixth aspect are provided as recited in claim 15 to claim 22.

According to a seventh aspect of the invention, an apparatus for reading two-dimensional code is provided which comprises:
at least one memory for storing computer-executable instructions; and
at least one processor communicably coupled to the at least one memory and configured to: execute the computer-executable instructions to perform the method according to any one of the embodiments described herein.

According to an eighth aspect of the invention, a non-transitory, computer readable medium comprises computer-executable instructions configured to direct at least one computer processor to perform the method according to any one of the embodiments described herein.

According to a ninth aspect of the invention, an apparatus for reading two-dimensional code is provided which comprises:
at least one processor;
at least one memory;
an image scanning module stored in the at least one memory and executable by the at least one processor to obtain an image of the two-dimensional code of any one of the embodiments described herein;
an image processing module stored in the at least one memory and executable by the at least one processor to:
based on the image, detect the distinct indicia;
based on the detected indicia, ascertain the reference indicium and the at least one data indicium;
ascertain the distance between the reference indicium and the at least one data indicium;
ascertain the angular displacement of the at least one data indicium relative to the reference direction
a mapping module stored in the at least one memory and having a plurality of bijective mappings between a plurality of combinations of code parameters and a plurality of data values; and
a decoding module stored in the at least one memory and executable by the at least one processor to:
based on the bijective mappings, ascertain at least one data value of the plurality of data values which corresponds to the at least one data indicium.

BRIEF DESCRIPTION OF DRAWINGS

Embodiments of the invention will be described in detail with reference to the accompanying drawings, in which:
FIG. 1A is an example of a two-dimensional code;
FIG. 1B illustrates distance and angular displacement measurements applied to FIG. 1A;
FIG. 2A is an example of a two-dimensional code;
FIG. 2B illustrates distance and angular displacement measurements applied to FIG. 2A;
FIG. 3A is an example of a two-dimensional code;
FIG. 3B illustrates distance and angular displacement measurements applied to FIG. 3A;
FIG. 4A is an example of a two-dimensional code;
FIG. 4B illustrates distance and angular displacement measurements applied to FIG. 4A;
FIG. 5A is an example of a two-dimensional code;
FIG. 5B illustrates distance and angular displacement measurements applied to FIG. 5A;
FIG. 6A is an example of a two-dimensional code;
FIG. 6B illustrates distance and angular displacement measurements applied to FIG. 6A;
FIG. 7A is an example of a two-dimensional code;
FIG. 7B illustrates distance and angular displacement measurements applied to FIG. 7A;
FIGS. 8, 9, and 10 are examples of two-dimensional code;
FIG. 11A is an example of a two-dimensional code;
FIG. 11B illustrates distance and angular displacement measurements applied to FIG. 11A;
FIG. 12A is a simplified flow chart showing a method for generating two-dimensional code.

DETAILED DESCRIPTION

Figures 12B, 12C:
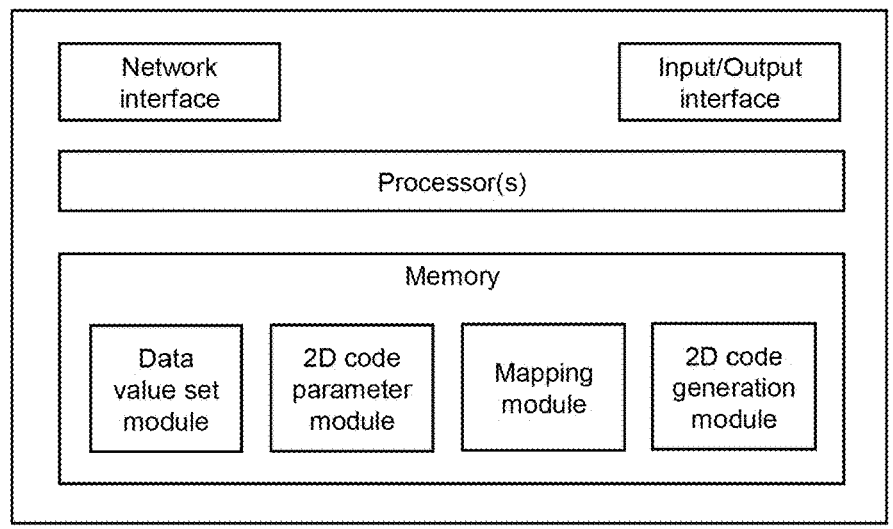
FIG. 12B shows a non-limiting example of bijective mappings.
FIG. 12C is a schematic representation of an apparatus for generating two-dimensional code.

In the following description, numerous specific details are set forth in order to provide a thorough understanding of various illustrative embodiments of the invention. It will be understood, however, to one skilled in the art, that embodiments of the invention may be practiced without some or all of these specific details. It is understood that the terminology used herein is for the purpose of describing particular embodiments only, and is not intended to limit the scope of the invention. In the drawings, like reference labels or numerals refer to same or similar functionalities or features throughout the several views. In the drawings, directional arrows shown between features illustrate data or information transfer therebetween in accordance with description of some embodiments but are not limited as such. In other words, data or information transfer in reverse to the directional arrows and/or not shown by directional arrow among features may be envisaged and are not shown to avoid obscuring description of the embodiments.

Embodiments described in the context of one of the apparatuses or methods are analogously valid for the other apparatuses or methods. Similarly, embodiments described in the context of an apparatus are analogously valid for a method, and vice versa.

Features that are described in the context of an embodiment or example may correspondingly be applicable to the same or similar features in the other embodiments or examples. Features that are described in the context of an embodiment or example may correspondingly be applicable to the other embodiments or examples, even if not explicitly described in these other embodiments or examples. Furthermore, additions and/or combinations and/or alternatives as described for a feature in the context of an embodiment or example may correspondingly be applicable to the same or similar feature in the other embodiments or examples.

It should be understood that the articles "a", "an" and "the" as used with regard to a feature or element include a reference to one or more of the features or elements. The term "and/or" includes any and all combinations of one or more of the associated feature or element. The terms "comprising", "including", "having", "involving" and any of their related terms, as used in description and claims, are intended to be open-ended and mean that there may be additional features or elements other than the listed ones. Identifiers such as "first", "second", "third", and so on, are used merely as labels, and are not intended to impose numerical requirements on their objects, nor construed in a manner imposing any relative position or time sequence between limitations.

The terms "indicium", "indicia", and related terms may include references to images, text, numbers, symbols, shapes, etc. The term "coupled" and related terms may be used in an operational sense and/or to refer to a direct physical connection or coupling. Thus, for example, two devices may be coupled directly, or via one or more intermediary devices; in another example, two indicia may be coupled to each other, e.g. connect or contact with each other. Based on the present disclosure, a person of ordinary skill in the art will appreciate a variety of ways in which coupling exists in accordance with the aforementioned definition.

Two-Dimensional Code

Embodiments of the invention provide a machine-readable two-dimensional code which comprises: a plurality of optically readable and distinct indicia which are arranged on a two-dimensional area, wherein the indicia include a reference indicium and further include at least one data indicium which represents at least one data value respectively. In other words, two or more data indicia may represent two or more data values respectively. The at least one data value is represented by at least one distance between the reference indicium and the at least one data indicium, and at least one angular displacement of the at least one data indicium which is relative to a reference direction. The reference direction is based on at least one of the indicia (alternatively referred to as a first one of the indicia) which is asymmetric or includes at most one line of symmetry.

In some embodiments, the first one of the indicia may be based on the reference indicium or one of the at least one data indicium. In certain other embodiments, the first one of the indicia may be based on a boundary indicium.

In some embodiments, the at least one data indicium includes a colour, wherein the at least one data value is further represented by the colour of the at least one data indicium. For example, data values represented by a particular data indicium vary according to its colours.

In some embodiments, the at least one data indicium includes a scaled dimension relative to a reference size, wherein the at least one data value is further represented by the scaled dimension of the at least one data indicium. For example, data values represented by a particular data indicium vary according to its dimensions.

In some embodiments, the at least one data value is non-binary. The at least one data value may include at least one of the group consisting of: integer, natural number, whole number, and real number. A non-binary data value may refer to a data value wherein the number of elements in the data value set which the data value belongs to is not a power of two, e.g. values which are a power of two are 2, 4, 8, 16, 32, 64, 128, 256, 512, 1024, 2048, etc.

In some embodiments, the two-dimensional code may further comprise at least one boundary indicium which defines a readable area of the code.

In some embodiments, the at least one boundary indicium is coupled, e.g. connected, to the reference indicium or a data indicium or both. In certain other embodiments, the at least one boundary indicium may be uncoupled, e.g. unconnected, to the reference indicium.

In some embodiments, the at least one data indicium includes a first data indicium and a second data indicium which are arranged at an overlap position, e.g. same or substantially same position, and respectively represent a first data value and a second data value which are the same. The first data indicium and a second data indicium are distinct indicia which are optically distinguishable even in the overlap position.

In some embodiments, the at least one data indicium includes a first data indicium and a second data indicium which are arranged at non-overlap positions and respectively represent a first data value and a second data value. Either the first data value or the second data value is adjustable by a predetermined positional adjustment, which is based on an offset, e.g. distance and/or angular displacement, between the non-overlap positions, such that the first data value and the second data value are the same due to the predetermined positional adjustment.

It is to be appreciated that the above-described embodiments may be implemented individually or in combination with any of the above or other embodiments.

Reference is made to FIGS. 1A, 1B, 2A, 2B, 3A, 3B, 4A, 4B, 5A, 5B, 6A, 6B, 7A, 7B, 8, 9, 10, 11A, and 11B illustrating non-limiting examples of two-dimensional codes according to various embodiments.

FIG. 1A illustrates an example of a two-dimensional code comprising a reference indicium '−' and a data indicium '*'. FIG. 1B, based on FIG. 1A, further illustrates a distance $D_1$ between the reference indicium and the data indicium, and an angular displacement $\Theta_1$ of the data indicium which is relative to a reference direction R. Here, the reference direction R is based on the reference indicium, e.g., reference direction R is an orthogonal or vertical direction relative to at least a predetermined part of the reference indicium.

Examples illustrated in FIGS. 2A and 2B are similar to FIGS. 1A and 1B respectively but further comprise a boundary indicium.

FIG. 3A illustrates an example of a two-dimensional code which comprises a reference indicium '−', and a first and a second data indicium '*' and '+' respectively. FIG. 3B, based on FIG. 3A, further illustrates a distance $D_1$ between the reference indicium and the first data indicium, a distance $D_2$ between the reference indicum and the second data indicium, an angular displacement $\Theta_1$ of the first data indicium which is relative to a reference direction R, and an angular displacement $\Theta_2$ of the second data indicium which is relative to the reference direction R. Here, the reference direction R is based on the reference indicium, e.g., reference direction is an orthogonal or vertical direction relative to at least a predetermined part of the reference indicium.

Examples illustrated in FIGS. 4A and 4B are similar to FIGS. 3A and 3B respectively but further comprise a boundary indicium.

FIG. 5A illustrates an example of a two-dimensional code which comprises a reference indicium '−', and a first and a second data indicium '*' and '+' respectively. FIG. 5B, based on FIG. 5A, further illustrates a distance $D_1$ between the reference indicium and the first data indicium, a distance $D_2$ between the reference indicium and the second data indicium, an angular displacement $\Theta_3$ of the first data indicium which is relative to a reference direction. Here, the reference direction is based on the first or the second data indicium, e.g. line distances $D_1$ and $D_2$.

Examples illustrated in FIGS. 6A and 6B are similar to FIGS. 5A and 5B respectively but further comprise a boundary indicium.

FIG. 7A illustrates an example of a two-dimensional code which comprises a boundary indicium represented by a frame, a reference indicium represented by an indicator at the frame, e.g. top right corner of the frame, and a data indicium '*'. Here, the indicator is represented by a triangle symbol. The reference indicium is coupled to the boundary indicium. FIG. 7B, based on FIG. 7A, further illustrates a distance $D_7$ between a predetermined part of the reference indicium and the data indicium, and an angular displacement $\Theta_7$ of the data indicium which is relative to a reference direction R. Here, the reference direction R is based on the reference indicium, e.g. the indicator at the upper right corner of the frame. It may be predetermined that this indicator provides the reference direction as a vertical direction as shown in FIG. 7B. Alternatively, it may be predetermined that this indicator may define the reference direction differently, e.g. horizontal direction to the right of FIG. 7B or horizontal direction to the left or FIG. 7B. Accordingly, the angular displacement $\Theta_7$ would be taken differently.

In FIG. 7A, the reference indicium and boundary indicium are coupled, e.g. presented as an integral or connected image with parts of the reference indicium and boundary indicium in contact and/or overlap. It is to be appreciated that, in some other examples, the reference indicium and boundary indicium may be uncoupled, e.g. presented as distinct or unconnected images with no parts in contact or overlap.

FIG. 8 illustrates an example of a two-dimensional code which is similar to FIG. 2A but further provides for the data indicium to include a scaled dimension relative to a reference size which may be predetermined. For example, the reference size may be based on typical dimension of the same data indicium in FIG. 2A. Here, the data indicium '*' in FIG. 8 is two times the reference size, e.g. dimensions, of the data indicium '*' in FIG. 2A. But it is to be appreciated that, in some other examples, the scaled dimension may be larger or smaller than a reference size.

FIG. 9 illustrates an example of a two-dimensional code which is similar to FIG. 2A but further provides for the data indicium to include a colour, e.g. data indicium is represented in a predetermined colour, or data indicium is enclosed in a region of a predetermined colour. This colour may be the same or distinct from the reference indicium and/or other data indicium. Here, the term "colour" may refer to non-white, non-black, or shades thereof.

FIG. 10 illustrates an example of a two-dimensional code which comprises a reference indicium '−', and a first, a second, and a third data indicium 'O', '+', 'I' respectively. The first, the second, and third data indicium 'O', '+', 'I' are distinct and overlapping. Their overlapping position is meant to represent same data values, however, the third indicium 'I' is non-visible or non-optically distinguishable as it is overlayed by the second indicium '+', while the overlapping first and the second indicium 'O', '+' are visible and optically distinguishable. Hence, the first and the second data indicium 'O', '+' can be properly represented and read. This example illustrates that two or more distinct indicia may be provided at a same position to represent same data values while remaining visible and optically distinguishable, but this depends on the design of the indicia.

FIGS. 11A and 11B illustrate an example of a two-dimensional code which comprises a reference indicium '−', and a first, a second, and a third data indicium 'O', '+', 'p' respectively. Similar to FIG. 10, the first and the second data indicium 'O', '+' are distinct and overlapping which are meant to represent same data values. The third data indicium 'p' is positioned offset from the other data indicia and would have represented a different data value due to the different position. However, according to embodiments of the invention, the third data indicium may represent same data value as the first or the second indicium after predetermined positional adjustments, e.g. angular offset. In other words, certain indicia, e.g. 'p', may be predefined as indicia which data value is to be adjusted in a predetermined manner in order to provide the intended data value.

In the example of FIG. 10, it may not be possible to provide an optically distinguishable third data indicium which overlaps with the first and the second data indicium at the same position, e.g. 5 mm and 45 degrees relative to the reference indicium. In other words, three data indicia of same data values may not be possibly provided at the same position. However, the example of FIGS. 11A and 11B provides three data indicia of same data values by providing two data indicia at the same position, e.g. 5 mm and 45 degrees relative to the reference indicium, and further providing a data indicia at an offset, e.g. 5 mm and 50 degrees relative to the reference indicium, which upon applying a predetermined positional adjustment would represent the same data value as the two data indicia.

It is to be appreciated that various modifications may be made to various aspects of the examples illustrated in the aforesaid figures. It is to be appreciated that these non-limiting variations may be applied individually or in combination with any of these or other variations.

For example, the reference indicium and/or data indicium may be represented by other symbols or images, e.g. square, circle, rectangle, triangle, rhombus, pentagon, hexagon, octagon, cube, cone, diamond, star, arrow, animal, tree, plant, food, building, logo, mountain, tea pot, tea leaf, coffee bean, etc.

For example, the boundary indicium may be represented by other shapes or forms, e.g. geometric shapes, non-geometric shapes, partially enclosed frame, an open frame, a combination of symbols or images such as the above-identified examples. For example, the boundary indicium may be represented by other outlines, e.g. solid lines, dotted lines, symbols or images such as the above-identified examples.

Generation of Two-Dimensional Code

Reference is made to FIG. 12A which is a simplified flow chart showing a method for generating two-dimensional code.

In block 121, code parameters may be determined. Examples of code parameters include, but are not limited to, a distance between a reference indicium and a data indicium, an angular displacement of the data indicium which is relative to a reference direction, a size of the data indicium relative to a reference size, a colour of the data indicium, etc.

In block 122, a set or range of data values may be determined. The set or range of data values (i.e. data value set) refers to the set of all possible data values that may be represented by the two-dimensional code and may be determined depending on desired application.

In block 123, a plurality of bijective mappings between a plurality of combinations of code parameters and a plurality of data values may be ascertained. With bijective mappings, each combination of code parameters is paired with exactly one element of the set of data values; each element of the set of data values is paired with exactly one combination of code parameters.

As an illustration, for pairings between element set X and element set Y to be bijective, the four following properties must hold:
1. Each element of X must be paired with at least one element of Y,
2. No element of X may be paired with more than one element of Y,
3. Each element of Y must be paired with at least one element of X, and
4. No element of Y may be paired with more than one element of X.

A non-limiting example of bijective mappings is provided in FIG. 12B. In this example, the code parameters include distance, angular displacement, size of data indicium; the data value set defines a range of possible target data values.

In block 124, a target data value is provided for a code to be generated therewith. The target data value is one of the values in the data value set.

In block 125, using the bijective mappings, a two-dimensional code, according to any embodiment in the present disclosure, is generated for the target data value.

Reference is made to FIG. 12C which is a schematic representation of an apparatus for generating two-dimensional code. The apparatus comprises: at least one processor; at least one memory for storing computer-executable instructions and communicably coupled to the at least one processor; and various modules stored in the at least one memory and described as follows.

A data value set module may be stored in the at least one memory and executable by the at least one processor to determine a plurality of data values, e.g. set or range of data values, including a target data value.

A code parameter module may be stored in the at least one memory and executable by the at least one processor to determine a plurality of combinations of code parameters.

A mapping module may be stored in the at least one memory and executable by the at least one processor to ascertain a plurality of bijective mappings between a plurality of combinations of code parameters and a plurality of data values.

A code generation module may be stored in the at least one memory and executable by the at least one processor to generate, using the bijective mappings, a two-dimensional code according to any embodiment in the present disclosure may be generated for the target data value, wherein the target data value is the at least one data value.

The apparatus may further comprise network interface for facilitating communication between the apparatus and other communication, scan and/or computing devices, and input/output interface for receiving inputs from other communication and/or computing devices or manual inputs and for providing outputs to other communication, computing, display and/or print devices.

Reading of Two-Dimensional Code

Figure 13A:
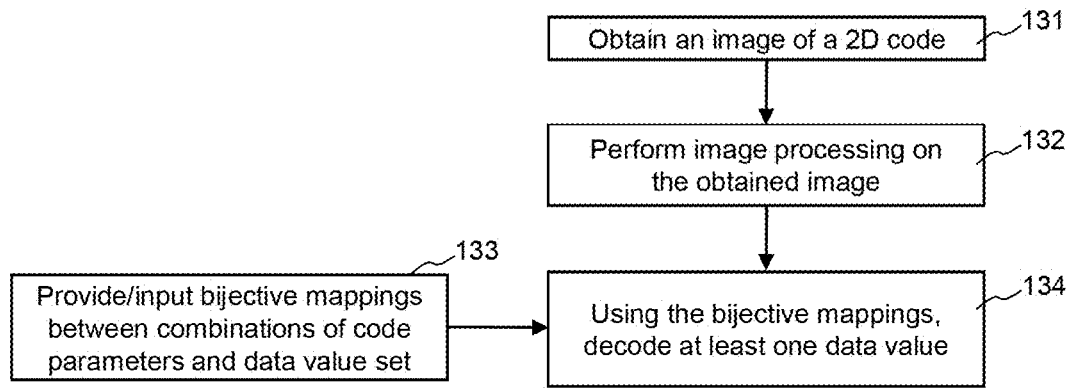
FIG. 13A is a simplified flow chart showing a method for reading two-dimensional code.

Reference is made to FIG. 13A which is a simplified flow chart showing a method for reading two-dimensional code which may be any one of the embodiments described in the present disclosure.

In block 131, an image of a two-dimensional code is obtained. This may be performed by an image scanning module, e.g. optical scanner or optical camera.

In block 132, image processing is performed on the obtained image. In particular, a plurality of distinct indicia is detected from the obtained image. Based on the detected indicia, a reference indicium and at least one data indicium are ascertained; a distance between the reference indicium and the at least one data indicium is ascertained; an angular displacement of the at least one data indicium, which is relative to a reference direction, is ascertained. The reference direction is based on a first one of the indicia which is asymmetric or includes at most one line of symmetry.

In block 133, based on the ascertained distance, the ascertained angular displacement, and a plurality of bijective mappings between a plurality of combinations of code parameters and a plurality of data values, at least one data value of the plurality of data values which corresponds to the at least one data indicium is ascertained. Here, the code parameters include the distance and the angular displacement.

In some embodiments, the first one of the indicia is the reference indicium or one of the at least one data indicium.

In some embodiments, block 132 further includes ascertaining a colour of the at least one data indicium. Hence, the code parameters further include the colour of the at least one data indicium. Accordingly, in block 134, performance of the ascertaining step is further based on the ascertained colour of block 132.

In some embodiments, block 132 further includes ascertaining a scaled dimension of the at least one data indicium relative to a reference size. Hence, the code parameters further include the scaled dimension of the at least one data indicium. Accordingly, in block 134, performance of the ascertaining step is further based on the ascertained scaled dimension of block 132.

In some embodiments, the at least one data indicium includes a first data indicium and a second data indicium which are arranged at an overlap position. Accordingly, in block 134, the ascertaining step includes ascertaining, respectively, a first data value and a second data value as same data values.

In some embodiments, the at least one data indicium includes a first data indicium and a second data indicium which are arranged at non-overlap positions. Accordingly, in block 134, the ascertaining step includes ascertaining either the first data indicium or the second data indicium as having a predetermined positional adjustment, ascertaining a first data value and a second data value, respectively for the first data indicium or the second data indicium, as same data values. Here, the code parameters include predetermined positional adjustment based on offset between two predetermined indicia.

Figure 13B:
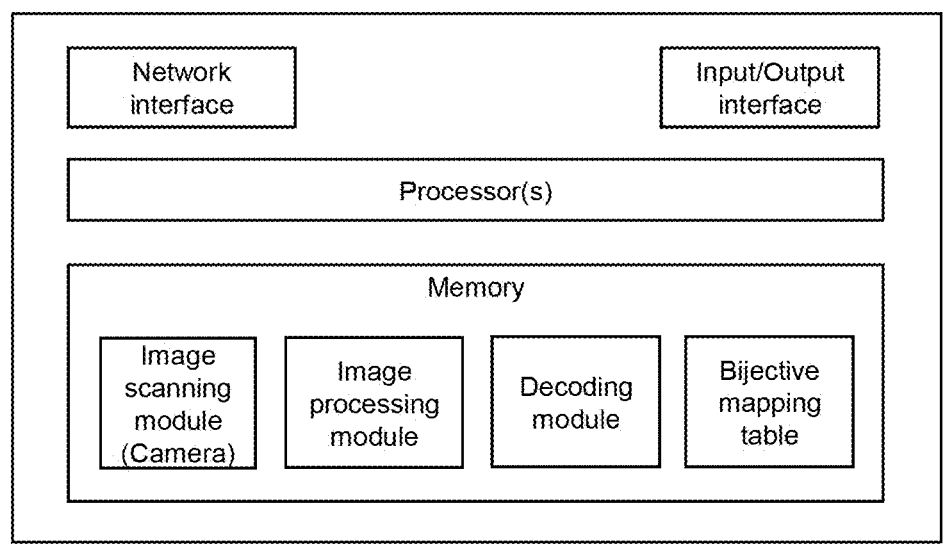
FIG. 13B is a schematic representation of an apparatus for reading two-dimensional code.

Reference is made to FIG. 13B which is a schematic representation of an apparatus for reading two-dimensional code. The apparatus comprises: at least one processor; at least one memory for storing computer-executable instructions and communicably coupled to the at least one processor; and various modules stored in the at least one memory and described as follows.

An image scanning module may be stored in the at least one memory and executable by the at least one processor to obtain an image of a two-dimensional code which may be any one of the embodiments described in the present disclosure.

An image processing module may be stored in the at least one memory and executable by the at least one processor to perform image processing which is detailed as follows. Based on the obtained image, a plurality of distinct indicia are detected. Based on the detected indicia, a reference indicium and at least one data indicium are ascertained. A distance between the reference indicium and the at least one data indicium is ascertained. An angular displacement of the at least one data indicium relative to a reference direction is ascertained.

A mapping module may be stored in the at least one memory and having a plurality of bijective mappings between a plurality of combinations of code parameters and a plurality of data values.

A decoding module may be stored in the at least one memory and executable by the at least one processor to: based on the bijective mappings, ascertain or decode at least one data value of the plurality of data values which corresponds to the at least one data indicium.

The apparatus may further comprise network interface for facilitating communication between the apparatus and other communication and/or computing devices, and input/output interface for receiving inputs from other communication, scan and/or computing devices or manual inputs and for providing outputs to other communication, computing, display and/or print devices.

Embodiments of the invention provide several advantages including but not limited to the following:

The two-dimensional code according to embodiments of invention utilize a distance between indicia and an angular displacement between indicia to represent data. This concept allows the creation of vastly different two-dimensional codes in terms of aesthetic design, functionality and ink efficiency. For example, aesthetic design of two-dimensional codes is customisable as the number of elements or indicia may be pre-fixed. In other words, the reference indicum and/or data indicium/indicia may represented by various symbols and/or images. For example, an indicium '+' may be replaced by an image of sun while indicia '*', '−', '/\' may be replaced by images of planets. This means that data representation in the two-dimensional codes according to embodiments of the invention are free of module, which refers to black and white dots which make up QR codes, and are also free of spaced parallel lines of variable widths and spacings which make up barcodes. On the other hand, QR codes and barcodes require a variable number of dots and lines which may not be customisable. For example, an insignificant area of the two-dimensional code according to embodiments of invention may require printing. On the other hand, in QR codes and barcodes requires, approximately 50% of the code area is printed and approximately 50% is non-printed as there is an equal chance that each pixel is printed or non-printed.

While optical technology for measuring distances and angular displacement is available with cameras, e.g. smartphones with multiple cameras, a problem associated with the use of distance and angular displacement between indicia between indicia to represent data is a need for consistent logical system for data representation. To address this, the mathematical concept of bijective mappings between the possible combinations parameters and data values is applied in embodiments of the invention. This would ensure that each two-dimensional code reading would yield exactly one unique data value and each unique data value would yield exactly one unique two-dimensional code image that can be read by a scanner.

Another problem associated with the use of distance and angular displacement between indicia would be the ordering of data. This problem may be illustrated by a two-dimensional code having several identical data indicia. While it is possible to measure the distance between the data indicia from a reference indicium, it is not possible to create an ordering of the data. This problem however will be solved if the indicia are distinct. It would then be possible to specify the ordering of the data through the identification of the distinct indicia. To address this, embodiments of the invention utilize distinct reference and data indicia as a solution to create an ordering of the data.

A problem associated with reading of two-dimensional code is a need to establish a reference direction to enable measurement of angular displacement between the reference indicium and data indicia. The invention utilizes asymmetric indicia or indicia with at most one line of symmetry which would make it possible during image processing to determine a reference direction from either the reference indicium or one of the data indicia.

Data capacity of two-dimensional code will be dependent on factors such as accuracy of the measurement of distance and angular displacement between the indicia. For example, if measurement accuracy of 1 mm and 1 degree can be obtained, a circular scanning area of radius 1 cm will yield 10 times 360 possible data values, which is equivalent to 3600 possible data values per data indicia. When n number of indicia is used, the total number of possible data values would be approximately 3600 to the power of n. However, data capacity may be constrained by the maximum number of distinct indicia that the two-dimensional code can contain. This would be dependent on factors such as the indicia design, the image processing methods and efficiency in distinguishing the various indicia and the number of parameters used such as colour, scaled dimensions and others. To address this potential problem, distinct indicia with predetermined positional adjustments are introduced as a way to maximize the maximum number of indicia that a scanning area can contain. FIG. 10 illustrate limitations of overlaying different indicia at a same position, while FIGS. 11A, 11B illustrate an embodiment in which an additional distinct indicia with predetermined positional adjustment is introduced to overcome the limitations of FIG. 10. It would be efficient to have a comprehensive list of distinct data indicia identifying the entire range of possible varying positional adjustments such as distance, angular displacement or other characteristics to maximize the use of predetermined positional adjustments and increase the maximum data capacity of the two-dimensional code.

It is to be appreciated that the flow charts showing logic flows are representative of exemplary methodologies for performing novel aspects of the invention. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

The flow charts showing logic flow may be implemented in software, firmware, hardware, or any combination thereof. In software and firmware embodiments, the logic flow may be implemented by computer executable instructions or code stored on a non-transitory computer readable medium or machine readable medium, such as an optical, magnetic or semiconductor storage. The computer-executable instructions are configured to direct at least one computer processor to perform the logic flow. The embodiments are not limited in this context.

It is to be appreciated that the apparatuses described herein are representative of exemplary apparatuses for performing novel aspects of the invention. Those skilled in the art will understand and appreciate that the apparatuses are not limited by their elements described herein. In any of the apparatuses described herein, it may comprise at least one memory and at least one processor communicably coupled thereto. The at least one processor may be any type of computer processor, such as a microprocessor, an embedded processor, a digital signal processor (DSP), a network processor, a multi-core processor, a single core processor, or other device configured to execute code or computer-executable instructions to perform or implement the flowcharts, algorithms, processes, or operations detailed herein. The at least one memory may be a non-transitory computer readable medium or machine readable medium for storing or comprising the code or computer-executable instructions. Examples include, but are not limited to, random access memory (RAM), read only memory (ROM), logic blocks of a field programmable gate array (FPGA), erasable programmable read only memory (EPROM), and electrically erasable programmable ROM (EEPROM).

It is to be understood that the embodiments and features described above should be considered exemplary and not restrictive. Many other embodiments will be apparent to those skilled in the art from consideration of the specification and practice of the invention. Furthermore, certain terminology has been used for the purposes of descriptive clarity, and not to limit the disclosed embodiments of the invention.

The invention claimed is:

1. A two-dimensional code comprising:
a plurality of optically readable and distinct indicia which are arranged on a two-dimensional area, wherein the indicia include a reference indicium and further include at least one data indicium which represents at least one data value respectively,
wherein the at least one data value is represented by at least one distance between the reference indicium and the at least one data indicium, and at least one angular displacement of the at least one data indicium which is relative to a reference direction,
wherein the reference direction is based on a first one of the indicia which is asymmetric or includes at most one line of symmetry, and
wherein the at least one data indicium includes a first data indicium and a second data indicium which are arranged at non-overlap positions, wherein the first data indicium or the second data indicium includes a predetermined positional adjustment such that the first data indicium and the second data indicium respectively represent a first data value and a second data value as same data values due to the predetermined positional adjustment, which is based on a difference between the non-overlap positions.

2. The two-dimensional code of claim 1, wherein the first one of the indicia is the reference indicium or one of the at least one data indicium.

3. The two-dimensional code of claim 1, wherein the at least one data indicium includes a colour, wherein the at least one data value is further represented by the colour of the at least one data indicium.

4. The two-dimensional code of claim 1, wherein the at least one data indicium includes a scaled dimension relative to a reference size, wherein the at least one data value is further represented by the scaled dimension of the at least one data indicium.

5. The two-dimensional code of claim 1, wherein the at least one data value is non-binary.

6. The two-dimensional code of claim 5, wherein at least one data value includes at least one of the group consisting of: integer, natural number, whole number, and real number.

7. The two-dimensional code of claim 1, wherein the indicia include at least one boundary indicium which defines a readable area of the code.

8. The two-dimensional code of claim 7, wherein the at least one boundary indicium is coupled to the reference indicium.

9. The two-dimensional code of claim 1, wherein the at least one data indicium includes a third data indicium and a fourth data indicium which are arranged at an overlap position and respectively represent a third data value and a fourth data value which are the same.

10. A method for two-dimensional code generation, the method comprising:
ascertaining a plurality of bijective mappings between a plurality of combinations of code parameters and a plurality of data values; and
for a target data value, generating the two-dimensional code according to claim 1, by using the bijective mappings, wherein the at least one data value includes the target data value, wherein the code parameters include the distance and the angular displacement.

11. An apparatus for generating two-dimensional code, the apparatus comprising:
at least one memory for storing computer-executable instructions; and
at least one processor communicably coupled to the at least memory unit and configured to: execute the computer-executable instructions to perform the method according to claim 10.

12. A non-transitory, computer readable medium comprising computer-executable instructions configured to direct at least one computer processor to perform the method according to claim 10.

13. An apparatus for generating two-dimensional code, the apparatus comprising:
at least one processor;
at least one memory;
a data value set module stored in the at least one memory and executable by the at least one processor to determine a plurality of data values including a target data value;
a code parameter module stored in the at least one memory and executable by the at least one processor to determine a plurality of combinations of code parameters;
a mapping module stored in the at least one memory and executable by the at least one processor to ascertain a plurality of bijective mappings between a plurality of combinations of code parameters and a plurality of data values; and
a code generation module stored in the at least one memory and executable by the at least one processor to generate, using the bijective mappings, the two-dimensional code according to claim 1 for the target data value, wherein the target data value is the at least one data value, wherein the code parameters include the distance and the angular displacement.

14. A method for reading two-dimensional code, the method comprising:

obtaining an image of the two-dimensional code;
performing image processing on the image, including:
- based on the image, detecting a plurality of distinct indicia;
- based on the detected indicia, ascertaining a reference indicium and at least one data indicium;
- ascertaining a distance between the reference indicium and the at least one data indicium;
- ascertaining an angular displacement of the at least one data indicium relative to a reference direction, wherein the reference direction is based on a first one of the indicia which is asymmetric or includes at most one line of symmetry; and
- based on the ascertained distance, the ascertained angular displacement, and a plurality of bijective mappings between a plurality of combinations of code parameters and a plurality of data values, ascertaining at least one data value of the plurality of data values which corresponds to the at least one data indicium, wherein the code parameters include the distance and the angular displacement,
- wherein the at least one data indicium includes a first data indicium and a second data indicium which are arranged at non-overlap positions, and
- wherein ascertaining the at least one data value of the plurality of data values which corresponds to the at least one data indicium includes:
- ascertaining either the first data indicium or the second data indicium as having a predetermined positional adjustment; and
- based on the predetermined positional adjustment, ascertaining a first data value and a second data value, respectively for the first data indicium or the second data indicium, as same data values.

15. The method of claim 14, wherein the first one of the indicia is the reference indicium or one of the at least one data indicium.

16. The method of claim 14, further comprising:
ascertaining a colour of the at least one data indicium,
wherein the code parameters include the colour of the at least one data indicium,
wherein ascertaining the at least one data value of the plurality of data values which corresponds to the at least one data indicium is further based on the ascertained colour of the at least one data indicium.

17. The method of claim 14, further comprising:
ascertaining a scaled dimension of the at least one data indicium relative to a reference size,
wherein the code parameters include the scaled dimension,
wherein ascertaining the at least one data value of the plurality of data values which corresponds to the at least one data indicium is further based on the ascertained scaled dimension of the at least one data indicium.

18. The method of claim 14, wherein the at least one data value is non-binary.

19. The method of claim 18, wherein at least one data value includes at least one of the group consisting of: integer, natural number, whole number, and real number.

20. The method of claim 14, wherein the indicia include at least one boundary indicium which identifies a readable area of the code.

21. The method of claim 20, wherein the at least one boundary indicium is coupled to the reference indicium.

22. The method of claim 14, wherein the at least one data indicium includes a third data indicium and a fourth data indicium which are arranged at an overlap position,
wherein ascertaining the at least one data value of the plurality of data values which corresponds to the at least one data indicium includes ascertaining a third data value and a fourth data value, respectively for the third data indicium and the fourth data indicium, as same data values.

23. An apparatus for reading two-dimensional code, the apparatus comprising:
- at least one memory for storing computer-executable instructions; and
- at least one processor communicably coupled to the at least memory and configured to: execute the computer-executable instructions to perform the method according to claim 14.

24. A non-transitory, computer readable medium comprising computer-executable instructions configured to direct at least one computer processor to perform the method according to claim 14.

25. An apparatus for reading two-dimensional code, the apparatus comprising:
- at least one processor;
- at least one memory;
- an image scanning module stored in the at least one memory and executable by the at least one processor to obtain an image of the two-dimensional code claim 1;
- an image processing module stored in the at least one memory and executable by the at least one processor to:
  - based on the image, detect the distinct indicia;
  - based on the detected indicia, ascertain the reference indicium and the at least one data indicium;
  - ascertain the distance between the reference indicium and the at least one data indicium;
  - ascertain the angular displacement of the at least one data indicium relative to the reference direction
- a mapping module stored in the at least one memory and having a plurality of bijective mappings between a plurality of combinations of code parameters and a plurality of data values; and
- a decoding module stored in the at least one memory and executable by the at least one processor to:
based on the bijective mappings, ascertain at least one data value of the plurality of data values which corresponds to the at least one data indicium.

* * * * *